US 7,504,475 B2

United States Patent
Dawkins et al.

(10) Patent No.: US 7,504,475 B2
(45) Date of Patent: Mar. 17, 2009

(54) PROCESS FOR A TWO STAGE MELT POLYMERIZATION FOR THE PRODUCTION OF POLYBENZIMIDAZOLE

(75) Inventors: Bobby G. Dawkins, Charlotte, NC (US); J. Dean Baker, Rock Hill, SC (US); Rita H. Joiner, Rock Hill, SC (US); Karin M. Hudson, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 577 days.

(21) Appl. No.: 11/178,905

(22) Filed: Jul. 11, 2005

(65) Prior Publication Data

US 2007/0010646 A1    Jan. 11, 2007

(51) Int. Cl.
*C08G 73/18*    (2006.01)
*C08G 73/00*    (2006.01)

(52) U.S. Cl. .................... 528/336; 528/327; 528/335; 528/339; 528/341; 528/342

(58) Field of Classification Search ............... 528/327, 528/335, 336, 339, 341, 342
See application file for complete search history.

(56) References Cited

U.S. PATENT DOCUMENTS

| 4,672,104 A | 6/1987 | Ward |
| 4,717,764 A | 1/1988 | Ward |
| 6,274,690 B1 | 8/2001 | Hoshida et al. |
| 7,060,782 B2 * | 6/2006 | Dawkins et al. .............. 528/327 |
| 2006/0004182 A1 | 1/2006 | Dawkins et al. |

* cited by examiner

*Primary Examiner*—Duc Truong
(74) *Attorney, Agent, or Firm*—Hammer & Associates, P.C.

(57) ABSTRACT

A process is presented for the production of high molecular weight polybenzimidazole, in two steps. Step one: provide a first reaction vessel and charge it with at least one aromatic hydrocarbon tetraamine, and a heterocyclic ring making up the dicarboxylic component. Heat the reactants under agitation. Terminate the agitation while continuing to heat the reaction mixture to about 230° C. while allowing the reaction mass to foam. Cool the reaction mass to a friable foamed mass. Crush the friable foamed mass to obtain a ground prepolymer. Step two; provide a second reaction vessel, transferring the ground prepolymer to it. A pressure wash of the first reaction vessel and the means for agitation to obtain a second ground prepolymer. Transfer the second ground prepolymer to the second reaction vessel. Heat the ground prepolymer and second ground prepolymer under agitation to a higher temperature than the first step until the desired degree of polymerization is achieved.

21 Claims, No Drawings

PROCESS FOR A TWO STAGE MELT POLYMERIZATION FOR THE PRODUCTION OF POLYBENZIMIDAZOLE

BACKGROUND OF THE INVENTION

The present invention provides a two-stage melt polymerization process for the production of high molecular weight polybenzimidazoles utilizing certain aromatic amines and aromatic dicarboxylic compounds as monomers.

Ward U.S. Pat. No. 4,672,104 teaches a two step process for the production of polybenzimidazoles. This two-stage melt polycondensation process has been found to operate with significant variations in product thermal history due to reactor design, yielding a product heterogeneous in IV, solubility, solution filtration quality, color, etc. Thus, efforts were initiated to optimize and improve the second stage SSP (solid-state polymerization) reaction equipment and process conditions.

Ward U.S. Pat. No. 4,717,764 teaches a two step process for the production of benzimidazoles/aromatic amide polymers and copolymers and wholly aromatic polyamides.

SUMMARY OF THE INVENTION

Polybenzimidazoles are prepared by reacting in a two stage polymerization process at least one aromatic tetraamine containing two pairs of amine substituents on an aromatic ring, the amine substituents being ortho to one another, and a dicarboxylic component consisting of at least one compound having the formula

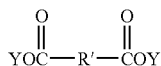

in which R' is a divalent organic radical more specifically defined hereinafter and may be the same or different in the various molecules making up the dicarboxylic component and the Y's may be hydrogen, aryl or alkyl, with no more than 95% of the total Y's in the various molecules making up the dicarboxylic component being hydrogen or phenyl considered separately.

In the first stage of the process, the mixture of aromatic tetraamine and dicarboxylic component is heated to condensation polymerization temperatures which are above the melting point of the aromatic tetraamine. Depending on the nature and melting point of the compound or compounds making up the dicarboxylic component, the resulting polymerizing mass is a liquid which may be a slurry of solid acid particles in melted tetraamine, or a homogeneous mixture of tetraamine and dicarboxylic component and/or an emulsion comprising melted tetraamine and melted dicarboxylic component. The heating is continued to between 230°-350° C. with concurrent strong agitation until the viscosity of the mixture rises to a point such that the agitator torque is above about 1.5 times, and generally no higher than about 6 times, the torque before the increase in viscosity begins to occur. The agitation is then terminated, and heating is continued while allowing the mass to foam to a friable mass. The resulting prepolymer is then cooled and crushed or ground to a powder which is transferred to a second reaction vessel. The first reaction vessel and means of agitation is then pressure washed to remove excess residue on the reaction vessel and means of agitation. The resulting wet residue from the pressure washing process is collected and transferred to the second reaction vessel. This "blend" polymer is defined as polymer remaining in the reactor after a reaction stage which has to be washed or water-blasted out. More facile removal is experienced after the first stage reaction (lower temperature and duration). Thus, improved and more uniform heat transfer can be realized after such polymer removal, and less "blend" polymer would be expected subsequently, improving regular dry polymer discharge yields and improved polymer product homogeneity with decreased reactor memory effects. The second cleaned reaction vessel has a means for agitation and a means for controlling pressure or vacuum. Subsequently the second reaction vessel is heated at a higher temperature than the first stage until the desired degree of polymerization is achieved.

DETAILED DESCRIPTION OF THE INVENTION

The polybenzimidazoles which can be produced by the process of this invention are those having repeating units of the following formula:

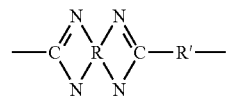

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran. Depending on whether the dicarboxylic acid moieties in the dicarboxylic monomer component are the same or different, R' may be the same or randomly different among the repeating units along the polymer chain. Moreover, depending on whether one or more than one tetraamine monomer is utilized in the polymerization, R may also be the same or randomly different along the polymer chain.

The following generalized equation illustrates the condensation reaction which occurs in forming the polybenzimidazoles having the recurring units of the foregoing formula:

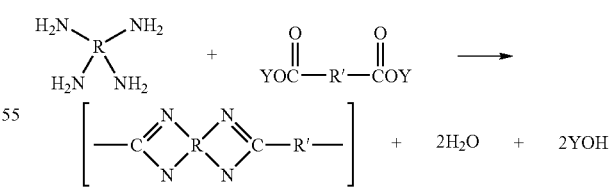

in which R, R' and Y are as previously defined. Such polybenzimidazoles are produced by the reaction of a mixture of (1) at least one aromatic tertraamine containing two groups of amine substituents, the amine substituents in each group being in an ortho position relative to each other, and (2) a dicarboxylic component as indicated in the foregoing equation and as more completely defined hereinafter.

Aromatic tetraamines which may be used, for example, are those with the following formulas:

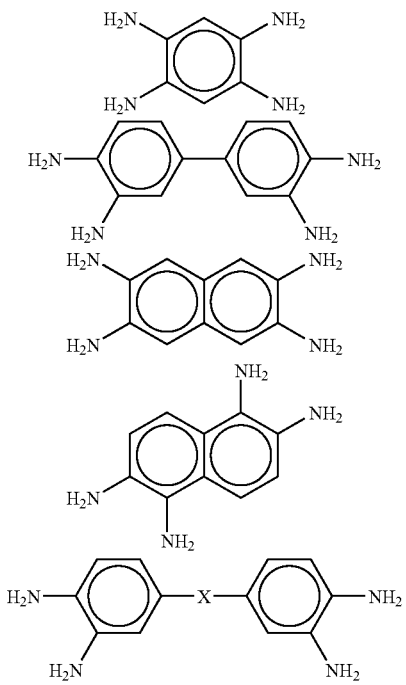

where X represents —O—, —S—, —SO$_2$, —C—, or a lower alkylene group, such as —CH$_2$—, —(CH$_2$)$_2$—, or —C(CH$_3$)$_2$ 3. Among such aromatic teteraamines may be mentioned, for example, 1,2,4,5-tetraminobenzene; 1,2,5,6-tetraminonaphthalene; 2,3,6,7-tetraminonaphthalene; 3,3',4,4'-tetraminodiphenyl methane; 3,3',4,4'-tetraminodiphenyl ethane; 3,3',4,4'-tetraminodiphenyl-2,2-propane; 3,3',4,4'-tetraminodiphenyl thioether; and 3,3',4,4'-tetraminodiphenyl sulfone. The preferred aromatic tetraamine is 3,3',4,4'-tetraminobiphenyl.

The compounds which comprise the dicarboxylic component of this invention are defined by the formula:

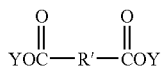

in which the Y's may be hydrogen, aryl or alkyl with no more than 95% of the Y's being hydrogen or phenyl. The dicarboxylic component may therefore consist of a mixture of a free acid with at least one diester and/or monoester; a mixture of diester(s) and/or monoester(s); or a single dialkyl ester, monoester or mixed aryl-alkyl or alkyl/alkyl ester but cannot consist completely of free acid or diphenyl ester. When Y is alkyl, it preferably contains 1 to 5 carbon atoms and is most preferably methyl. When Y is aryl, it may be any monovalent aromatic hydrocarbon group obtained by filling with hydrogen all the valences but one of the aromatic groups which may be R or R' as disclosed previously, either unsubstituted or substituted with any inert monovalent radical such as alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

The dicarboxylic acids which are suitable in free or esterified form as part of the dicarboxylic component as previously described for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxylic groups are substituents upon carbon atoms in a ring compound such as pyridine, pyrazine, furan, quinoline, thiophene, and pyran.

The preferred dicarboxylic acids which may be utilized in free or esterified form as described are aromatic dicarboxylic acids such as those illustrated below:

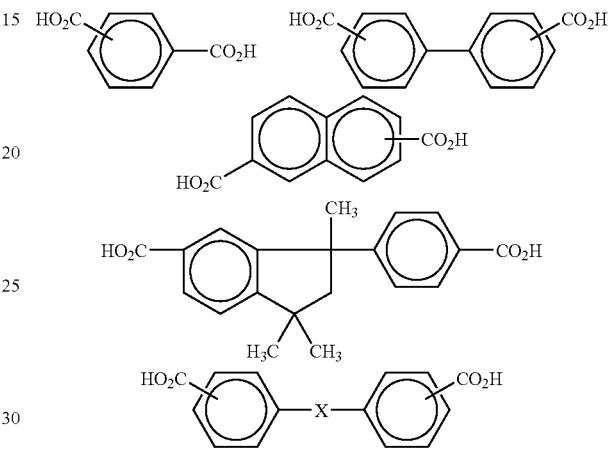

where X is as defined above. For example, the following diacids can suitably be employed: isophthalic acid; terephthalic acid; 4,4'-biphenydicarboxylic acid; 1,4-naphthalenedicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4'-diphenyletherdicarboxylic acid; 4,4'-diphenylsulfonedicarboxylic acid; 4,4'-diphenylthioetherdicarboxylic acid. Isophthalic acid is the dicarboxylic acid which in free or esterified form, or diphenyl isophthalate (1,3-benzene dicarboxylic acid, diphenyl ester) are the most preferred for use in the process of the present invention.

Preferably the dicarboxylic component is one of the following combinations: (1) at least one free dicarboxylic acid and at least one diphenyl ester of a dicarboxylic acid; (2) at least one free dicarboxylic acid and at least one dialkyl ester of a dicarboxylic acid, and (3) at least one diphenyl ester of a dicarboxylic acid and at least one dialkyl ester of a dicarboxylic; and (4) at least one dialkyl ester of a dicarboxylic acid. The dicarboxylic moieties of the compounds of each combination may be the same or different and the alkyl groups of the alkyl esters of combinations (2), (3) and (4) generally contain 1 to 5 carbon atoms and are most preferably methyl.

It is preferred to employ the dicarboxylic component in a ratio of about 1 mole of total dicarboxylic component per mole of aromatic tetraamine. However, the optimal ratio of reactants in a particular polymerization system can be easily determined by one of ordinary skill in the art.

Examples of polybenzimidazoles which may be prepared according to the process of the present invention include:
poly-2,2'-(m-phenylene)-5,5'-bibenzimidazole;
poly-2,2'-(biphenylene-2"2''')-5,5'-bibenzimidazole,
poly-2,2'-(biphenylene-4"4''')-5,5'-bibenzimidazole;

poly-2,2'-(1",1",3"-trimethylindanylene-3"5"-p-phenylene-5,5'-bibenzimidazole;
2,2'-(m-phenylene)-5,5'-bibenzimidazole/2,2-(1",1",3"-trimethylindanylene) 5",3"-(p-phenylene)-5,5'-bibenzimidazole copolymer;
2,2'-(m-phenylene)-5,5-bibenzimidazole/2,2'-biphenylene-2",2'")-5,5'-bibenzimidazole copolymer;
poly-2,2'-(furylene-2",5")-5,5'-bibenzimidazole;
poly-2,2'-(naphthalene-1",6")-5,5'-bibenzimidazole;
poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2"-(m-phenylene)-5,5"-di(benzimidazole)propane-2,2; and
poly-ethylene-1,2-2,2"-(m-phenylene)-5,5"-dibenzimidazole)ethylene-1,2 where the double bonds of the ethylene groups are intact in the final polymer.

The preferred polybenzimidazole prepared by the process of the present invention is poly-2,2'-(m-phenylene)-5,5'-bibenzimidazole, the recurring unit of which is: where n is an integer in excess of 75. This polymer can be prepared in accordance with the process of the present invention by the reaction of 3,3',4,4'-tetraminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

The process of the invention may be used to produce polybenzimidazoles of one or more aromatic tetraamines and one or more dicarboxylic acids. In general, stoichiometric quantities of the total tetraamine and dicarboxylic component are utilized, or a slight molar excess of the dicarboxylic component.

The first stage of the process of the invention is carried out by heating the aromatic tetraamine, dicarboxylic component, with strong agitation to a temperature in the range of 230°-350° C. and preferably 280°-340° C. in the first reaction vessel. The reaction vessel has an agitation means and a means for controlling temperature. Optionally the reaction vessel can have a means for controlling pressure. The agitation means is any mechanical device capable of mixing or agitating the reactants. Some means for agitation include but are not limited to a shaft with blades, a shaft with protrusions, screw type agitator, a cavitator, a mixer, a blender, or an agitator. Depending on the melting point of the compounds of the dicarboxylic component and the chemical nature of the tetraamine and the dicarboxylic component, the liquid mass being agitated will be a slurry, a homogenous mixture or an emulsion of two immiscible liquids. When the viscosity of the reacting mass begins to rise as indicated by increased torque on the agitator manifested by increased energy of agitation, the agitation is discontinued and the mass heated further and allowed to foam. The point at which the agitation is discontinued is generally such that the agitator torque and energy of agitation has not risen above, for example, about 1000% of the initial torque or agitation energy after the tetraamine has melted, preferably not above about 300% such initial torque or agitation energy. The mass is then heated further without agitation and held to a temperature in the range, for example, of about 230° to 350° C., preferably about 280° to 340° C. Such heating is continued for a period of time in the range, for example, of about 15 to 240 minutes and in one embodiment from about 0.5 to 1.5 hours. The friable foamed mass is then cooled to a temperature 40 to 200° C., which renders it easily pulverized. In this application pulverized is meant to include crushing, grinding, milling, abrating, pounding, smashing, grating or any other means of reducing the foaming mass to a powder or fine granules. The friable mass is then pulverized into a powder, then heated to a temperature in the range of 230 to 350° C., and held there for 30 to 90 minutes. In general, the inherent viscosity of the prepolymer after the first stage reaction is completed is in the range, for example, of about 0.05 to 0.3 dl/g, (All inherent viscosities were measured from a solution of 0.4% by weight of polymer in 96.5% sulfuric acid at 25° C.).

The ground prepolymer maybe cooled to <80° C., then removed and transferred to a second (or cleaned) reaction vessel. This reaction vessel has a means for agitation, a means to control temperature, and a means for controlling pressure or vacuum.

Further, the initial reaction vessel and means of agitation is then cleaned with a pressurized water spray. In this application we define pressure wash as having a water pressure at the nozzle of less than 1000 psig or 70.3 kilogram-force/square centimeter gauge. This often runs from 200 psig to 990 psig (14.1 kilogram-force/square centimeter gauge to 69.6 kilogram-force/square centimeter gauge) and in another embodiment the pressure wash is used from 300 psig to 900 psig (21.1 kilogram-force/square centimeter gauge to 63.3 kilogram-force/square centimeter gauge). It can also be performed by a lancing step, where we define lancing as having a water pressure of more than 1000 psig (70.3 kilogram-force/square centimeter gauge) at the nozzle. This is usually done at a pressure between 1100 psig and 6000 psig (77.3 kilogram-force/square centimeter gauge to 421.8 kilogram-force/square centimeter gauge). In another embodiment the lancing is performed using a water pressure of between 2500 psig to 5500 psig (175.8 kilogram-force/square centimeter gauge to 386.7 kilogram-force/square centimeter gauge). Either a pressure wash or lancing is used to remove excess prepolymer residue from the reaction vessel and means of agitation. The resulting wet residue from the pressure wash or lancing process is collected as a resulting wash mixture. With this process if the first reaction vessel is pressure washed after the pulverized prepolymer is let down, then the need to lance the reaction vessel is reduced significantly. Additionally with the lancing step generally more water is used. The water usage may be increased by as much as 30 to 50 times the amount of water usage in the pressure washing step. As the lancing step requires much higher pressures it is more dangerous to an operator. In a production setting any process that helps lower costs and increases safety is desirable.

This resulting wash mixture is then processed to remove most of the water which results in a wet pulverized prepolymer. This water removal can be accomplished by sending the wet pulverized prepolymer through a slurry system to remove the bulk of the water. This slurry system can be a centrifuge, a filter or any other means of solid-liquid separation. Filtration can be vacuum filtration or pressure filtration. Separation may also be achieved by mechanical squeezing and pressing or other solid/liquid separation technology. This water removal may also be accomplished by heating the wet pulverized prepolymer to drive off any excess water. This wet pulverized prepolymer is then transferred to either a second reaction vessel or a cleaned first reaction vessel. As used herein a cleaned reaction vessel is a reaction vessel which has been subjected to either the pressure wash or a lancing which has been described above. This wet pulverized prepolymer is a collection of the residue from the reaction vessel and the agitator blades and shaft which is referred to as the "blend." By cleaning the vessel after the first reaction there is far less build up which results in a substantial decrease in build up after the second reaction. As the reintroduction of the blend materials to a production batch tends to have a detrimental impact on the inherent viscosity of the finished product the use of this process helps to more tightly control the properties of the resulting high molecular weight polybenzimidazole.

The reaction vessel used in this process must have enough capacity to allow for the foaming during the first step. A subsequent run during the second step leaves the reaction vessel at less than maximum capacity. Therefore in this process it is possible to run multiple first steps and collect the pulverized prepolymer and the wet pulverized and combine them together before running the second step in either a second reaction vessel or a cleaned first reaction vessel.

During the second step of the reaction, after transferring the pulverized prepolymer to the second reaction vessel, or the cleaned first reaction vessel, the pulverized prepolymer is heated under agitation to between 315° to 400° C. and preferably to between 330° to 400° C. In heating the pulverized prepolymer under agitation a slight positive pressure is applied, this slight positive pressure can be atmospheric pressure or it is between or equal to 2 mbar to 30 mbar or between 0.25 inches of $H_2O$ to 5 inches of $H_2O$ or 0.63 cm of $H_2O$ to 13 cm of $H_2O$. The pulverized prepolymer is heated for a time between 90 minutes and 400 minutes, preferably between 200 and 360 minutes or between 220 to 330 minutes. At this point the contents of the vessel can be let down or discharged, which yields a high molecular weight polybenzimidazole.

In both stages of the process of the present invention, a pressure may be employed. That pressure may be equal to at least atmospheric pressure, e.g., one to two atmospheres, and in one embodiment equal to atmospheric pressure. Such a pressure is commonly obtained and controlled by employing an open polymerization system provided with a condenser in order to remove the condensate compounds, typically phenol and water, which are produced as by-products of the reaction.

Both stages of the process are conducted in a substantially oxygen-free atmosphere. For example, an inert gas such as nitrogen or argon can be continuously passed through the reaction zone during the polymerization. The inert gas employed should be substantially oxygen-free, i.e., contain less than about 20 ppm (parts per million) of oxygen, preferably less than about 8 ppm, and more preferably, be oxygen-free. The inert gas is introduced into the reaction zone at a rate of flow measured at standard conditions, that is, atmospheric pressure and temperature, within the range of about 1 to 200 percent of the volume of the reaction zone per minute. The inert gas can be passed into the polymerization reaction zone at room temperature or, if desired, preheated to the reaction temperature. One way to achieve a substantially oxygen-free atmosphere is to pump $N_2$ into the reaction chamber at a rate of between 0.6 standard liters per minute (SLPM) to 4.6 SLPM.

The process of the present invention can be used to produce a high molecular weight polybenzimidazole product as indicated by relatively high inherent viscosity, averaging at least 0.8 dl/g, and with 1.1 dl/g achievable, and higher. The polymerization process of this invention can be carried out without a catalyst, although if used, has the effect of increasing IV in many cases.

Inherent viscosity (IV) is the ratio of the specific viscosity of a solution of known concentration to the concentration of solute extrapolated to zero concentration, measured in units of dl/g. Inherent or intrinsic viscosity is also called the limiting viscosity number. It is directly proportional to the polymer-average molecular weight. IV measurements are based on the concentration of the polymer sample tested, g/100 ml or g/deciliter. The polymer is dissolved at the 0.4% (w/v) level in 100 ml of 96.5% (+/−0.5%) sulfuric acid at 80° C. After filtering, an aliquot is measured for IV using a calibrated capillary viscometer in a 25+/−0.1 C water bath, the flow time (sec.) of the PBI polymer solution measured vs. the dissolving solvent. IV=[ln(t1/t2)]/c, where the natural log of the flow time of the PBI solution (t1) over the flow time of the solvent (t2) is divided by the PBI solution concentration.

Polybenzimidazoles are used for different purposes based on the IV and particle size/particle size distribution. Polybenzimidazoles having an average particle size (PS) of less than 150 microns (100-mesh) are generally used commercially as polymer resins and need to have a minimum inherent viscosity of 0.5. For production of extruded fibers and extruded films it is better to have larger particles, generally 300 microns or more, having an inherent viscosity (IV) of about 0.8 or more. Typically, the average IV for an extrusion charge may be somewhat lower, pending the "blend" polymer level, since this becomes a weighted average of regular and "blend" polymer. This is significant for this art and practice since the "blend" polymer level is reduced significantly.

Plugging Value (PV), or filterability, is measured by forming a 5% solution of the polymer in 97% sulfuric acid, or a 9% solution in dimethylacetamide containing 2% lithium chloride, and filtering the solution at 200 psig nitrogen pressure until the filter is plugged. The PV, which is the number of grams of dry polymer filtered per unit area of filter before blockage occurs, is expressed in grams of polymer per square centimeter. A higher value indicates a polymer solution containing less gels and insolubles.

EXAMPLES

Example 1

The objective was to significantly reduce the amount of blend polymer compared to that obtained during the normal polymerization process while producing polymer with typical key properties. The primary measures are listed below:

| Primary Measures | Baseline | Criteria for Success | Actual Results (Average of 5 batches) |
|---|---|---|---|
| % Blend | 28.8 (σ = 7.7) | <14.4 | 9.0 |
| IV of Regular >150μ | 0.84 (+/−0.16) | 0.68 to 1.00 | 0.72 |
| IV of Blend >150μ | Unknown | Same as Regular | 0.69 |
| PV of Blend >150μ | Unknown | >2.4 | 7.0 |

Assumptions: When removing first stage polymer from reaction vessels, cleaning and recharging the first stage polymer, the resulting second reaction "blend" polymer is no different from the regular polymer, but it is expected to have smaller particle size and lower IV than regular polymer since it is the last material washed out of the reaction vessels.

Eight first reaction or first stage batches, polybenzimidazole prepolymer from 815 mol of 3,3',4,4'-tetraminobiphenyl (TAB) and 819 mol of diphenyl isophthalate (DPIP), were discharged from the reaction vessels over several days. The full 90-minute first reaction and an additional hold time of 45 minutes at 290° C. were completed on all first reaction batches. Vessel preparation before charging, included lancing. However, after each first stage batch was produced (A through H), the vessels were assessed for cleanliness, and lanced only if there was buildup or film after completing prewashing and washing.

Two dry discharge batches from the first stage were completed together as a double batch for the second reaction (see Table 2). The first stage blends from all the batches were combined and completed in one single reactor batch (I) where (I) is a blend from first stage batches A, B, C, D, E, F, G, and H. All the batch yields were more than 99%.

The IV and PV tests were completed on the polymer after drying and sieving out the particles less than 150 microns to compensate for any differences due to particle size. Table 2 below shows the results:

| $2^{nd}$ Stage Batch# | $1^{st}$ Stage Batches | Blend % (adjusted for moisture) | Regular IV (dl/g) | Regular PV (g/cm2) | Blend IV (dl/g) | Blend PV (g/cm2) |
|---|---|---|---|---|---|---|
| 1 | A, C | 9.4 | 0.69 | 31.5 | 0.58 | 10.7 |
| 2 | B, D | 10.7 | 0.83 | 39.7 | 0.68 | 5.6 |
| 3 | E, G | 6.5 | 0.71 | 26.9 | 0.74 | 7.2 |
| 4 | F, H | 8.1 | 0.79 | 13.8 | 0.78 | 4.8 |
| 5 | I | 10.1 | 0.57 | 12.8 | 0.67 | 6.6 |
| | AVG: | 9.0 | 0.72 | 24.9 | 0.69 | 7.0 |

Conclusion: The blend percentage was significantly reduced using this modified process and the regular and blend polymer properties were in the normal range.

Statistics:

The percent blend data was statistically lower or improved compared to 137 control batches completed previously (9% vs. 29%).

There was no statistical difference in IV of the regular polymer >150µ compared to the blend polymer >150µ (regular and blend produced by this modified process).

Regular PV >150µ was statistically higher than blend PV >150µ, but both were above the desired lower limit (regular and blend produced by this modified process).

There was no statistical difference in the IV or PV of the regular polymer produced from this modified process compared to the control method.

Example 2

In this example, the objective was to determine if residual first stage polymer could be removed from the reactor using lower pressure water. Also, a secondary goal was to produce higher IV's than previously obtained using this process.

Four first reaction or first stage batches were discharged from the reactors over two days (same quantities as in Example 1 above). The full 90 minute first reaction and 45 minute additional hold time at 290 C were completed on all first reaction batches. Reaction vessel preparation included lancing. After each dry first stage polymer batch was discharged, the vessels were prewashed as normal, and then washed using a pressure washer operating at 800 psig. Two first stage dry discharge batches along with the wet prepolymer from the same batches were completed together as a double batch for the second reaction for a total of two batches.

The primary measures and results from this example are listed in Table 3 below:

| Primary Measures | Baseline | Criteria for Success | Actual Results Batch 6 (J, L) | Batch 7 (K, M) | Average |
|---|---|---|---|---|---|
| % Blend | 28.8 (σ = 7.7) | <14.4 | 9.5 | 9.2 | 9.3 |
| IV of Regular >150µ | 0.84 (+/−0.16) | >0.78 | 0.95 | 0.81 | 0.88 |

Conclusion: Significantly reducing the water pressure needed to clean the reaction vessels is feasible using this method and can be done while producing normal IV polymer and a substantially lower blend polymer percentage.

What is claimed is:

1. A process for a melt polymerization for the production of high molecular weight polybenzimidazole which comprises the steps of:
    charging a reaction vessel with a plurality of reactants capable of producing a polybenzimidazole to create a reaction mass, said reaction vessel having a means for agitation and a means for controlling atmosphere;
    heating said reactants under agitation in a substantially oxygen-free atmosphere with agitation until the agitator torque is from about 1.5 to about 6 times the torque before a rise in viscosity begins;
    terminating the agitation while continuing to heat the reaction mixture to a temperature of from 230° to 350° C. while allowing said reaction mass to foam;
    cooling said reaction mass to a friable foamed mass;
    pulverizing said friable foamed mass to obtain a pulverized prepolymer;
    reheating pulverized prepolymer to a temperature of from 230° to 350° C. for a period of time between 15 minutes and 240 minutes then removing said pulverized prepolymer;
    pressure washing said reaction vessel and said means for agitation to obtain a resulting wash mixture;
    separating excess water from said resulting wash mixture to obtain a wet pulverized prepolymer;
    transferring said pulverized prepolymer and said wet pulverized prepolymer to said reaction vessel;
    heating said pulverized prepolymer and said wet pulverized prepolymer under agitation to between 315° to 400° C. at atmospheric pressure for a time between 90 minutes and 400 minutes.

2. The process for a two stage melt polymerization for the production of high molecular weight polybenzimidazole according to claim 1 where said pressure wash is performed at a pressure of less than or equal to 70.3 kilogram-force/square centimeter gauge (1000 psig).

3. The process for a two stage melt polymerization for the production of high molecular weight polybenzimidazole according to claim 1 where said pressure wash is a lancing step performed at a pressure of greater than 70.3 kilogram-force/square centimeter gauge (1000 psig).

4. The process for a two stage melt polymerization for the production of high molecular weight polybenzimidazole according to claim 1 further providing the step of:
    cooling said first reaction vessel prior to the pressure washing step.

5. The process for a two stage melt polymerization for the production of high molecular weight polybenzimidazole according to claim 1 where in the step of cooling said reaction mass, said reaction mass is cooled to a temperature from 40° C. to 200° C.

6. The process for a two stage melt polymerization for the production of high molecular weight polybenzimidazole according to claim 1 where after said pulverized prepolymer is heated to a temperature of from 230° to 350° C. for a period of time between 15 minutes and 240 minutes it is then cooled to a temperature of less than or equal to 80° C. before it is removed from said reaction vessel.

7. The process for a two stage melt polymerization for the production of high molecular weight polybenzimidazole according to claim 1 where in the step of transferring said pulverized prepolymer to said second reaction vessel additional batches of the pulverized prepolymer can be added to the reaction vessel.

8. The process for a two stage melt polymerization for the production of high molecular weight polybenzimidazole according to claim 1 where said plurality of reactants capable of producing a polybenzimidazole are at least one aromatic hydrocarbon tetraamine containing two pairs of amine substituents on an aromatic ring in ortho position and a dicarboxylic component consisting of at least one compound having the formula:

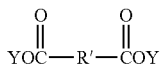

in which R' is a divalent organic radical of the class consisting of an aromatic hydrocarbon ring, an alkylene group, and a heterocylic ring and may be the same or different in the various molecules making up the dicarboxylic component and the Y's may be hydrogen, aryl or alkyl with no more than 95% of the Y's being hydrogen or phenyl.

9. The process for a two stage melt polymerization for the production of high molecular weight polybenzimidazole according to claim 1 where in the step of separating excess water from said resulting wash mixture is selected from the group consisting of: centrifuge, filter, other means of solid-liquid separation, heating or combinations thereof.

10. A process for a two stage melt polymerization for the production of high molecular weight polybenzimidazole in a first stage and in a second stage which comprises the first stage steps of:
providing a first reaction vessel having a means for agitation and a means for controlling atmosphere;
charging said reaction vessel with at least one aromatic hydrocarbon tetraamine containing two pairs of amine substituents on an aromatic ring in ortho position and a dicarboxylic component consisting of at least one compound having the formula:

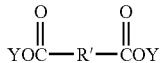

in which R' is a divalent organic radical of the class consisting of an aromatic hydrocarbon ring, an alkylene group, and a heterocylic ring and may be the same or different in the various molecules making up the dicarboxylic component and the Y's may be hydrogen, aryl or alkyl with no more than 95% of the Y's being hydrogen or phenyl to create a reaction mass;

heating said reactants under agitation in a substantially oxygen-free atmosphere with agitation until the agitator torque is from about 1.5 to about 6 times the torque before a rise in viscosity begins;
terminating the agitation while continuing to heat the reaction mixture to a temperature of from 230° to 350° C. while allowing said reaction mass to foam;
cooling said reaction mass to a friable foamed mass;
pulverizing said friable foamed mass to obtain a pulverized prepolymer;
reheating pulverized prepolymer to a temperature of from 230° to 350° C. for period of time between 15 minutes and 240 minutes;
removing pulverized prepolymer;
pressure washing said first reaction vessel and said means for agitation to obtain a resulting wash mixture;
separating excess water from said resulting wash mixture to obtain a wet pulverized prepolymer;
removing wet pulverized prepolymer; and
proceeding to a second stage which comprises the steps of:
providing a second reaction vessel having a means for agitation and a means for controlling atmosphere;
transferring said pulverized prepolymer and said wet pulverized prepolymer to said second reaction vessel;
heating said pulverized prepolymer and said wet pulverized prepolymer under agitation to between 315° to 400° C. at atmospheric pressure for a time between 90 minutes and 400 minutes.

11. The process for a two stage melt polymerization for the production of high molecular weight polybenzimidazole according to claim 10 where said pressure wash is performed at a pressure of less than or equal to 70.3 kilogram-force/square centimeter gauge (1000 psig).

12. The process for a two stage melt polymerization for the production of high molecular weight polybenzimidazole according to claim 10 where said pressure wash is a lancing step performed at a pressure of greater than 70.3 kilogram-force/square centimeter gauge (1000 psig).

13. The process for a two stage melt polymerization for the production of high molecular weight polybenzimidazole according to claim 10 where said second reaction vessel is also said first reaction vessel.

14. The process for a two stage melt polymerization for the production of high molecular weight polybenzimidazole according to claim 10 further providing the step of:
cooling said first reaction vessel prior to the pressure washing step.

15. The process for a two stage melt polymerization for the production of high molecular weight polybenzimidazole according to claim 10 where in the step of cooling said reaction mass, said reaction mass is cooled to a temperature from 40° C. to 200° C.

16. The process for a two stage melt polymerization for the production of high molecular weight polybenzimidazole according to claim 10 where after said pulverized prepolymer is heated to a temperature of from 230° to 350° C. for a period of time between 15 minutes and 240 minutes it is then cooled to a temperature of less than or equal to 80° C. before it is removed from said first reaction vessel.

17. The process for a two stage melt polymerization for the production of high molecular weight polybenzimidazole according to claim 10 where in the step of transferring said pulverized prepolymer to said second reaction vessel additional batches of the pulverized prepolymer can be added to the reaction vessel.

18. The process for a two stage melt polymerization for the production of high molecular weight polybenzimidazole according to claim 10 where said aromatic dicarboxylic component comprises a diphenyl ester of an aromatic dicarboxylic acid.

19. The process for a two stage melt polymerization for the production of high molecular weight polybenzimidazole according to claim 18 where said diphenyl ester is diphenyl isophthalate.

20. The process for a two stage melt polymerization for the production of high molecular weight polybenzimidazole according to claim 10 where said aromatic tetraamine is 3,3', 4,4'-tetraminobiphenyl.

21. The process for a two stage melt polymerization for the production of high molecular weight polybenzimidazole according to claim 10 where in the step of separating excess water from said resulting wash mixture is selected from the group consisting of: centrifuge, filter, other means of solid-liquid separation, heating or combinations thereof.

\* \* \* \* \*